(12) United States Patent
Bhattacharya et al.

(10) Patent No.: US 11,361,135 B2
(45) Date of Patent: Jun. 14, 2022

(54) GUIDING SAMPLE SIZE CHOICE IN ANALOG DEFECT OR FAULT SIMULATION

(71) Applicant: Synopsys, Inc., Mountain View, CA (US)

(72) Inventors: Mayukh Bhattacharya, Palo Alto, CA (US); Mihir Sherlekar, Mountain View, CA (US); Antony Fan, Mountain View, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 17/339,186

(22) Filed: Jun. 4, 2021

(65) Prior Publication Data

US 2021/0383047 A1    Dec. 9, 2021

Related U.S. Application Data

(60) Provisional application No. 63/035,475, filed on Jun. 5, 2020.

(51) Int. Cl.
| | |
|---|---|
| *G06F 30/3308* | (2020.01) |
| *G06F 30/31* | (2020.01) |
| *G06F 30/39* | (2020.01) |
| *G06F 111/04* | (2020.01) |
| *G06F 117/02* | (2020.01) |
| *G06F 113/18* | (2020.01) |

(52) U.S. Cl.
CPC .......... *G06F 30/3308* (2020.01); *G06F 30/31* (2020.01); *G06F 30/39* (2020.01); *G06F 2111/04* (2020.01); *G06F 2113/18* (2020.01); *G06F 2117/02* (2020.01)

(58) Field of Classification Search
CPC ...... G06F 30/3308; G06F 30/31; G06F 30/39; G06F 2111/04; G06F 2113/18; G06F 2117/02; G06F 30/38; G06F 30/367
See application file for complete search history.

(56) References Cited

U.S. PATENT DOCUMENTS

| | | | |
|---|---|---|---|
| 9,268,663 B1* | 2/2016 | Siddiqui | G06F 11/3404 |
| 10,853,550 B1* | 12/2020 | Zhang | G06F 30/367 |
| 2018/0203963 A1* | 7/2018 | Eghbal | G06F 30/394 |

* cited by examiner

*Primary Examiner* — Nha T Nguyen
(74) *Attorney, Agent, or Firm* — Patterson + Sheridan, LLP

(57) ABSTRACT

A method of evaluating sampling sizes for circuit simulation comprises generating a plurality of coverage scenarios based on a defect universe, determining a coverage amount for each of the plurality of coverage scenarios, and associating the plurality of coverage scenarios with a plurality of bins based on the coverage amount for each of the plurality of coverage scenarios. The method further comprises sampling, with a first sampling size, each of the coverage scenarios to determine first sampled coverage scenarios, and determining an error value for each of the plurality of coverage scenarios based on the coverage amount of each of the plurality of coverage scenarios and a coverage amount of a respective one of the first sampled coverage scenarios. Further, the method comprises generating, with a processor and for the first sampling size, a confidence score for each of the plurality of bins based on the error value for each of the plurality of coverage scenarios, and outputting the confidence score for each of the plurality of bins.

20 Claims, 14 Drawing Sheets

```
dvec = defect vector;
Nf = length_of(dvec);
weight_map = map between defect_id and weight;
sample_array = [array of sample sizes];
// size of bin_array depends on bin size for TC and DC
// if TC, and bin size is 2%, then size is 51.
// if DC, and bin size is 2%, then size is 51*51=2601
bin_array = [array of bins];

// for 2% bin sizes
if (coverage_type == test)
  trial_size = 10000;
else
  // coverage_type == diagnostic
  trial_size = 500000;

for (sample_size = one element of sample_array)
   {
   print "Sample size: " sample_size;

trial=0;
   while (trial < trial_size)
       {
       trial++;

randomly_shuffle(dvec);

Nc = uniform_random_int(0, Nf);
       if (coverage_type == diagnostic)
         Nd = uniform_random_int(0, Nc);
       // mark first Nc of shuffled dvec as "covered"
       dvec_covered = mark_covered(dvec, Nc);
       // mark first Nd of shuffled dvec as "detected"
       if (coverage_type == diagnostic)
         dvec_detected = mark_detected(dvec, Nd);

TCg = Weighted_Test_Coverage(dvec_covered, weight_map);
       tc_bin_number = tc_bin_assignment(TCg);
       if (coverage_type == diagnostic)
          {
          DCg = Weighted_Diagnostic_Coverage(dvec_detected, weight_map);
          dc_bin_number = dc_bin_assignment(TCg, DCg);
          }
```

510 (brace grouping the if/else trial_size block)

512 (brace grouping the for-loop block)

FIG. 5A

```
        dvec_sampled = Sampling_Algorithm(dvec, sample_size);
        TCs = Sampled_Weighted_Test_Coverage(dvec_covered, weight_map,
                  dvec_sampled);
        if (coverage_type == diagnostic)
          DCs = Sampled_Weighted_Diagnostic_Coverage(dvec_detected,
                  weight_map, dvec_sampled);

error_tc = TCs-TCg;
        if (coverage_type == diagnostic)
          error_dc = DCs-DCg;

// update bin_errors
        save_error_tc(error_tc, tc_bin_number);
        if (coverage_type == diagnostic)
          save_error_dc(error_dc, dc_bin_number);
    } if (coverage_type == test)
    {
        for (tc_bin_number = one bin from array of test-coverage-bins)
        {
          print "Test Coverage: " TC of this bin;
          print "95% Confidence interval: "
          if (bin_size >= 100)
          {
              sort(bin_error);
              // drop lowest 2.5% and highest 2.5% errors in sorted bin_error
              print (lowest,highest) in bin_error;
          }
          else
          {
              print "insufficient data";
          }
        }
    }
```

− 514 (first block)
− 516 (second block)
− 518 (third block)

FIG. 5B

```
else
 // coverage_type == diagnostic
 {
    for (tc_bin_number = one bin from array of diagnostic-coverage-bins)
      {
      print "Diagnostic Coverage: " DC of this bin;
      print "95% Confidence interval: "
      if (bin_size >= 100)
        {
           sort(bin_error);
           // drop lowest 2.5% and highest 2.5% errors in sorted bin_error
           print (lowest,highest) in bin_error;
        }
      else
        {
           print "insufficient data";
        }
      }
  }
}
```
⎫
⎬ 520
⎭

FIG. 5C

| Coverage Percentage | Error Margin | Neg. Bin Count | Pos. Bin Count |
|---|---|---|---|
| 2 | [-2.0,2.3] | 113 | 98 |
| 4 | [-2.3,3.8] | 94 | 102 |
| 6 | [-3.1,4.3] | 116 | 117 |
| 8 | [-3.3,4.8] | 92 | 102 |
| 10 | [-4.0,4.1] | 103 | 106 |
| 12 | [-4.9,4.3] | 121 | 97 |
| 14 | [-5.0,6.0] | 89 | 87 |
| 16 | [-4.8,4.9] | 113 | 103 |
| 18 | [-4.6,6.2] | 106 | 115 |
| 20 | [-5.0,5.3] | 104 | 79 |
| 22 | [-5.1,5.9] | 100 | 110 |
| 24 | [-5.9,6.9] | 91 | 89 |
| 26 | [-6.6,5.9] | 91 | 92 |
| 28 | [-7.2,6.7] | 98 | 88 |
| 30 | [-6.3,6.9] | 107 | 93 |
| 32 | [-5.7,6.6] | 79 | 101 |
| 34 | [-6.7,6.1] | 98 | 81 |
| 36 | [-6.2,7.5] | 111 | 115 |
| 38 | [-6.8,6.6] | 114 | 104 |
| 40 | [-7.0,6.4] | 121 | 103 |
| 42 | [-6.6,7.3] | 99 | 104 |
| 44 | [-7.2,6.1] | 114 | 98 |
| 46 | [-7.7,7.4] | 95 | 103 |
| 48 | [-5.9,6.3] | 98 | 98 |
| 50 | [-6.5,6.3] | 99 | 91 |
| 52 | [-6.0,7.8] | 76 | 103 |
| 54 | [-6.2,6.1] | 88 | 89 |
| 56 | [-7.0,7.9] | 85 | 104 |
| 58 | [-7.6,6.4] | 102 | 88 |
| 60 | [-6.9,6.0] | 102 | 85 |
| 62 | [-6.7,6.8] | 95 | 98 |
| 64 | [-7.0,6.7] | 109 | 106 |
| 66 | [-7.0,5.9] | 108 | 114 |
| 68 | [-6.0,5.8] | 106 | 96 |
| 70 | [-6.8,6.4] | 104 | 89 |
| 72 | [-6.8,6.5] | 91 | 104 |
| 74 | [-5.8,6.3] | 92 | 112 |
| 76 | [-6.7,6.1] | 107 | 92 |
| 78 | [-7.1,6.6] | 91 | 95 |
| 80 | [-5.7,5.5] | 97 | 94 |
| 82 | [-6.1,6.0] | 105 | 107 |
| 84 | [-5.3,5.1] | 102 | 103 |
| 86 | [-4.7,5.0] | 74 | 97 |
| 88 | [-4.4,4.9] | 88 | 112 |
| 90 | [-4.7,3.9] | 101 | 100 |
| 92 | [-4.7,3.2] | 105 | 92 |
| 94 | [-3.6,3.5] | 88 | 106 |
| 96 | [-3.2,2.7] | 101 | 97 |
| 98 | [-2.6,2.0] | 83 | 105 |

FIG. 6

| Coverage Percentage | Error Margin | Neg. Bin Count | Pos. Bin Count |
|---|---|---|---|
| 2 | [-2.9,7.2] | 152 | 119 |
| 4 | [-4.8,8.4] | 137 | 127 |
| 6 | [-6.2,11.0] | 94 | 115 |
| 8 | [-8.5,10.0] | 109 | 115 |
| 10 | [-10.1,14.1] | 113 | 97 |
| 12 | [-8.4,14.5] | 85 | 117 |
| 14 | [-9.6,11.9] | 86 | 87 |
| 16 | [-10.1,16.9] | 102 | 101 |
| 18 | [-10.3,11.0] | 105 | 96 |
| 20 | [-11.2,13.3] | 94 | 86 |
| 22 | [-12.5,17.3] | 118 | 87 |
| 24 | [-13.4,18.2] | 78 | 103 |
| 26 | [-13.6,14.2] | 93 | 98 |
| 28 | [-11.8,17.8] | 100 | 110 |
| 30 | [-15.3,17.1] | 79 | 97 |
| 32 | [-16.0,13.0] | 102 | 78 |
| 34 | [-15.5,14.5] | 94 | 91 |
| 36 | [-13.9,15.0] | 85 | 93 |
| 38 | [-16.8,16.4] | 95 | 110 |
| 40 | [-18.9,14.5] | 102 | 107 |
| 42 | [-15.7,14.1] | 110 | 113 |
| 44 | [-17.6,14.7] | 99 | 110 |
| 46 | [-16.8,16.5] | 89 | 87 |
| 48 | [-21.5,16.9] | 87 | 96 |
| 50 | [-15.8,17.0] | 96 | 105 |
| 52 | [-20.5,17.3] | 94 | 78 |
| 54 | [-13.4,16.3] | 89 | 108 |
| 56 | [-16.9,17.2] | 118 | 93 |
| 58 | [-17.6,22.7] | 81 | 87 |
| 60 | [-17.3,14.4] | 83 | 79 |
| 62 | [-15.0,21.6] | 92 | 114 |
| 64 | [-15.0,16.5] | 98 | 82 |
| 66 | [-18.0,14.6] | 87 | 91 |
| 68 | [-15.9,17.1] | 91 | 86 |
| 70 | [-16.1,17.6] | 113 | 88 |
| 72 | [-17.2,15.7] | 89 | 87 |
| 74 | [-18.3,14.1] | 78 | 103 |
| 76 | [-15.4,13.6] | 98 | 85 |
| 78 | [-15.7,12.9] | 98 | 100 |
| 80 | [-15.8,12.4] | 103 | 112 |
| 82 | [-13.1,13.7] | 103 | 83 |
| 84 | [-12.4,11.6] | 90 | 107 |
| 86 | [-12.9,13.0] | 92 | 84 |
| 88 | [-14.3,12.1] | 87 | 102 |
| 90 | [-12.5,10.3] | 98 | 94 |
| 92 | [-12.4,8.7] | 72 | 103 |
| 94 | [-9.3,6.6] | 101 | 103 |
| 96 | [-8.0,4.9] | 87 | 136 |
| 98 | [-8.1,2.9] | 109 | 143 |

FIG. 8

GUIDING SAMPLE SIZE CHOICE IN ANALOG DEFECT OR FAULT SIMULATION

RELATED APPLICATION

This application claims the benefit of U.S. provisional patent application Ser. No. 63/035,475, filed Jun. 5, 2020, which is hereby incorporated herein by reference.

TECHNICAL FIELD

The present disclosure relates to defect or fault simulation for an integrated circuit.

BACKGROUND

Sampling reduces the number of defects and/or faults used during a simulation process for circuit testing. Reducing the number of defects and/or faults reduces the total number of simulations performed, reducing the total turnaround time when producing test coverage numbers and confidence intervals. However, in such simulation methods, the confidence levels for each sampling size are not known until after the defect simulations are completed. Accordingly, the circuit simulations for each sampling size are performed, increasing the processing time and processing power needed to verify the accuracy of the sampled circuit simulations. Thus, even though many simulation processes employ sampling techniques, the simulations are cost prohibitive in both processing time and processing power.

SUMMARY

In one example, method of evaluating sampling sizes for circuit simulation comprises generating a plurality of coverage scenarios based on a defect universe, determining a coverage amount for each of the plurality of coverage scenarios, and associating the plurality of coverage scenarios with a plurality of bins based on the coverage amount for each of the plurality of coverage scenarios. The method further comprises sampling, with a first sampling size, each of the coverage scenarios to determine first sampled coverage scenarios, and determining an error value for each of the plurality of coverage scenarios based on the coverage amount of each of the plurality of coverage scenarios and a coverage amount of a respective one of the first sampled coverage scenarios. Further, the method comprises generating, with a processor and for the first sampling size, a confidence score for each of the plurality of bins based on the error value for each of the plurality of coverage scenarios, and outputting the confidence score for each of the plurality of bins.

In one example, a non-transitory computer readable medium comprising stored instructions, which when executed by a processor, cause the processor to generate a plurality of coverage scenarios based on a defect universe, determine a coverage amount for each of the plurality of coverage scenarios, and associate the plurality of coverage scenarios with a plurality of bins based on the coverage amount for each of the plurality of coverage scenarios. Further, the instructions, which when executed by the processor, cause the processor to sample, with a first sampling size, each of the coverage scenarios to determine first sampled coverage scenarios, and determine an error value for each of the plurality of coverage scenarios based on the coverage amount of each of the plurality of coverage scenarios and a coverage amount of a respective one of the first sampled coverage scenarios. The instructions, which when executed by the processor, further cause the processor to generate, for the first sampling size, a confidence score for each of the plurality of bins based on the error value for each of the plurality of coverage scenarios, and output the confidence score for each of the plurality of bins.

In one example, a system for simulating sampling sizes for circuit simulation comprises a coverage scenario module, a sampling module, and a confidence score module. The coverage scenario module is configured to generate a plurality of coverage scenarios based on a defect universe, determine a coverage amount for each of the plurality of coverage scenarios, and associate the plurality of coverage scenarios with a plurality of bins based on the coverage amount for each of the plurality of coverage scenarios. The sampling module is further configured to sample, with a first sampling size, each of the coverage scenarios to determine first sampled coverage scenarios. The confidence score module is further configured to determine an error for each of the plurality of coverage scenarios based on the coverage amount of each of the plurality of coverage scenarios and a coverage amount of a respective one of first the sampled coverage scenarios, generate, for the first sampling size, a confidence score for each of the plurality of bins based on the error for each of the plurality of coverage scenarios, and output the confidence score for each of the plurality of bins.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 5A, 5B, and 5C depicts example pseudocode for generating sampling error for simulating circuits, in accordance with some embodiments of the present disclosure.

FIG. 6 depicts an example table of sampling error associated with test coverage scenarios to be used in simulating circuits, in accordance with some embodiments of the present disclosure.

FIG. 8 depicts an example table of sampling error associated with diagnostic coverage scenarios to be used in simulating circuits, in accordance with some embodiments of the present disclosure.

DETAILED DESCRIPTION

Figure 1:
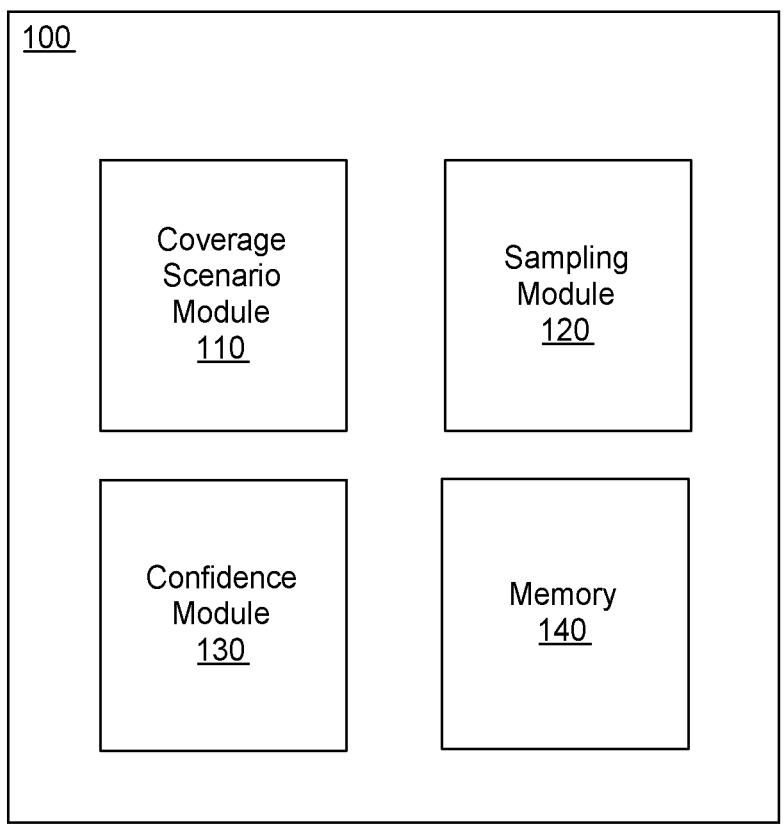
FIG. 1 illustrates a schematic block diagram of a computer system, in accordance with some embodiments of the present disclosure.

Aspects described herein relate guiding sampling size choice in analog defect or fault simulation. Integrated circuits (ICs) commonly include both digital and analog components (i.e., circuitry). Such ICs may be referred to as mixed signal ICs. The digital and analog components of the mixed signal ICs are tested to detect faults (i.e., defects) within the functionality of the digital and analog components. For example, the digital components of a mixed signal IC may be tested through digital fault simulations and design-for-testability processes, among others. However, due to the maturation of the digital component, it is more likely that a fault will occur within the analog components than the digital components of a mixed signal IC.

In applications that use mixed signal ICs, up to about 80% of the field returns (e.g., defect detections) are attributed to the analog components of the ICs. Manufacturing test coverage is related to the number of defective chips returned from the field. Further, the defect level, DL, is the fraction of faulty ICs from among the ICs that passed the production tests. For example, the defect level may be determined based the equation, $DL=1-Y^{(1-TC)}$, where Y=Yield, and TC=Test Coverage.

A difficulty arises when assessing the test coverage (TC) for analog components of mixed signal ICs, as many of the current analog circuitry fault and defect simulations are not accurate or fast enough to properly assess the test coverage for analog circuits. Further, advanced driver-assist systems (ADAS) are being employed in a growing number of modern vehicle applications. The use of these systems is projected to continue to grow as the as the implementation of totally hands-off-eyes-off autonomous vehicles increases. Most of the ICs at the heart of the ADAS systems have a significant analog component, and are considered mission critical components as a failure of one or more of the ICs may lead to a failure within the ADAS systems. Fault simulation of the mission-critical circuit components may be used to compute the quality metrics (e.g., single-point fault metric (SPFM), latent fault metric (LFM), probabilistic metric of hardware failures (PMHF)) of the mission-critical components as recommended by the functional safety standards (e.g., ISO 26262). However, many of the current analog circuit simulation and testing methods are not fast and/or accurate enough to support the fault simulation of the mission-critical circuit components as the size of defect universe is large due to the large number of ICs within many ADAS systems.

In the following, sampling techniques are described to reduce the number of simulations that are used to compute the test coverage, improve the accuracy, and reduce the processing cost. The sampling of each of the coverage scenarios is performed before the simulations. Accordingly, a sampled coverage scenario having a reduced number of defects may be selected for simulation, reducing the processing time and processing power used during the simulation process. Using a reduced number of defects reduces the simulation cost (e.g., processing power and/or processing time).

FIG. 1 illustrates an example computer system 100 for simulating and aiding in the selection of different sampling sizes to be used in simulating circuit elements, according to one or more examples. The computer system 100 may be configured similar to the 1200 of FIG. 12, or host system 1107 of FIG. 11. For example, the computer system 100 includes one or more processing devices that execute instructions stored in one or more memory devices.

The computer system 100 includes a coverage scenario module 110, a sampling module 120, and a confidence module 130, and a memory 140. The coverage scenario module 110 includes instructions (e.g., the instructions 1226 of FIG. 12) stored in a memory (e.g., the main memory 1204 of FIG. 12) or a machine-readable medium (e.g., the machine-readable storage medium 1224 of FIG. 12) executable on one or more processing devices (e.g., the processing device 1202 of FIG. 12). The coverage scenario module 110 receives a defect universe from the memory 140. The memory 140 may be the main memory 1204 of FIG. 12 or another memory device. The defect universe is based on one or more of a defect likelihood information, circuit netlist information, and a defect model. In one example, defect likelihood is the probability that a particular defect will occur. Circuit netlist information is a transistor-level description of a circuit in one or more netlist file formats. Defect model is an electrical model of a defect. For example, a short defect could be modeled as a resistor having a very low resistance (e.g., about 100 Ohms) and an open defect could be modeled by a very high resistance (e.g., about 100 Giga Ohms). The coverage scenario module 110 generates coverage scenarios based on the defect universe. The coverage scenario module 110 further determines a coverage amount for each of the coverage scenarios. The coverage amount corresponds to a coverage type (e.g., a test coverage or a diagnostic coverage) for each of the coverage scenarios. The test coverage is a percentage of the weighted defects of a coverage scenario having effects observable at outputs of a circuit under test (CUT). The diagnostic coverage is the percentage of the dangerous defects having effects observable at the outputs of a safety mechanism of the CUT. In one example, dangerous defects are the defects which cause a circuit's behavior at its output ports to be incorrect. From a functional safety point of view, this is considered to be dangerous. The coverage scenario module 110 stores the coverage amounts within the memory 140. The coverage scenario module 110 further associates the coverage scenarios with bins based on the coverage amounts. For example, the coverage scenario module 110 applies binning to the coverages scenarios to group the coverage scenarios based on the coverage amounts. The coverage scenario module 110 stores the association between the coverage scenarios and the bins in the memory 140.

Figure 12:
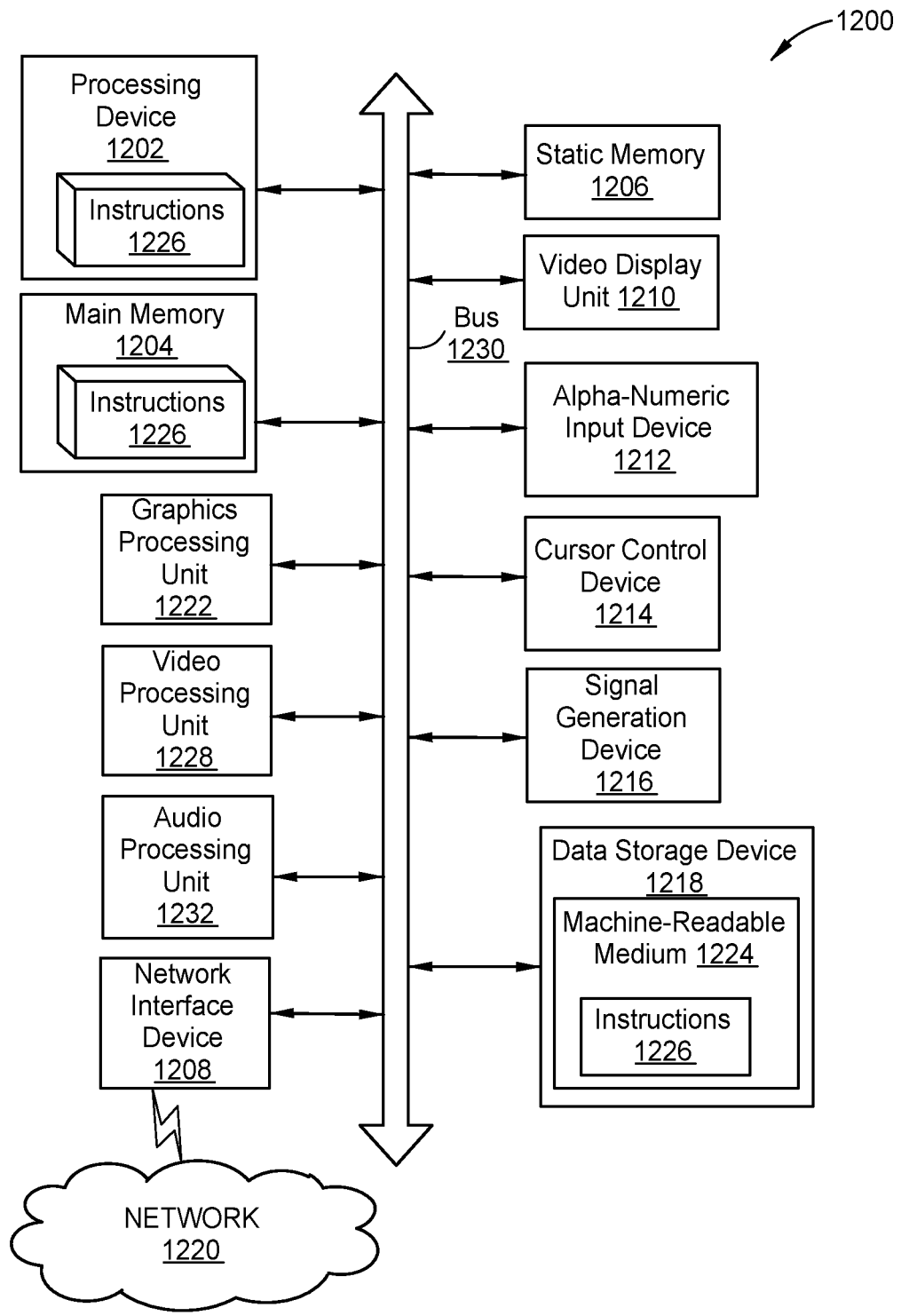
FIG. 12 depicts an abstract diagram of an example computer system in which embodiments of the present disclosure may operate.

The sampling module 120 includes instructions (e.g., the instructions 1226 of FIG. 12) stored in a memory (e.g., the main memory 1204 of FIG. 12) or a machine-readable medium (e.g., the machine-readable storage medium 1224 of FIG. 12) executable on one or more processing devices (e.g., the processing device 1202 of FIG. 12). The sampling module 120 is connected to the coverage scenario module 110 and the memory 140. The sampling module samples each of the coverage scenarios with one or more sampling sizes to determine sampled coverage scenarios. For example, the sampling module 120 applies a sampling algorithm to each of the coverage scenarios stored within the memory 140 for each sampling size to generate samples coverage scenarios having a reduced number of defects. The sampling algorithm may be one of a simple random sampling algorithm, a stratified sampling algorithm, a cluster sampling algorithm, a multistage sampling algorithm, and a systematic random sampling algorithm, among others. The sampling size is in a range of about 10 samples to about 3200 samples. However, in other examples, more than 3200 samples may be used. The sampling algorithm and sampling sizes may be stored within the memory 140. Further, the sampled coverage scenarios are stored within the memory 140.

The confidence module 130 includes instructions (e.g., the instructions 1226 of FIG. 12) stored in a memory (e.g., the main memory 1204 of FIG. 12) or a machine-readable medium (e.g., the machine-readable storage medium 1224 of FIG. 12) executable on one or more processing devices (e.g., the processing device 1202 of FIG. 12). The confidence module 130 is connected to the sampling module 120 and the memory 140. The confidence module 130 determines an error value for each of the coverage scenarios. For example, the confidence module 130 receives the coverage amounts for the coverage scenarios and sampled coverage scenarios from the memory 140 and determines an error value for each of the coverage scenarios based on a respective coverage amount and a respective one of the sampled coverage scenarios. The confidence module 130 further generates a confidence score for each bin based on the error value for each coverage scenario for a respective sampling size. The confidence module 130 outputs the confidence score for each bin. In one example, the confidence module 130 stores the confidence score for each bin the memory 140. Further, the confidence score for each bin may be displayed on a display (e.g., the video display unit 1210 of FIG. 12), printed, and/or provided to another processing system. For example, the confidence score for each bin may be provided to a simulation processing system for circuit simulation.

Figure 2:
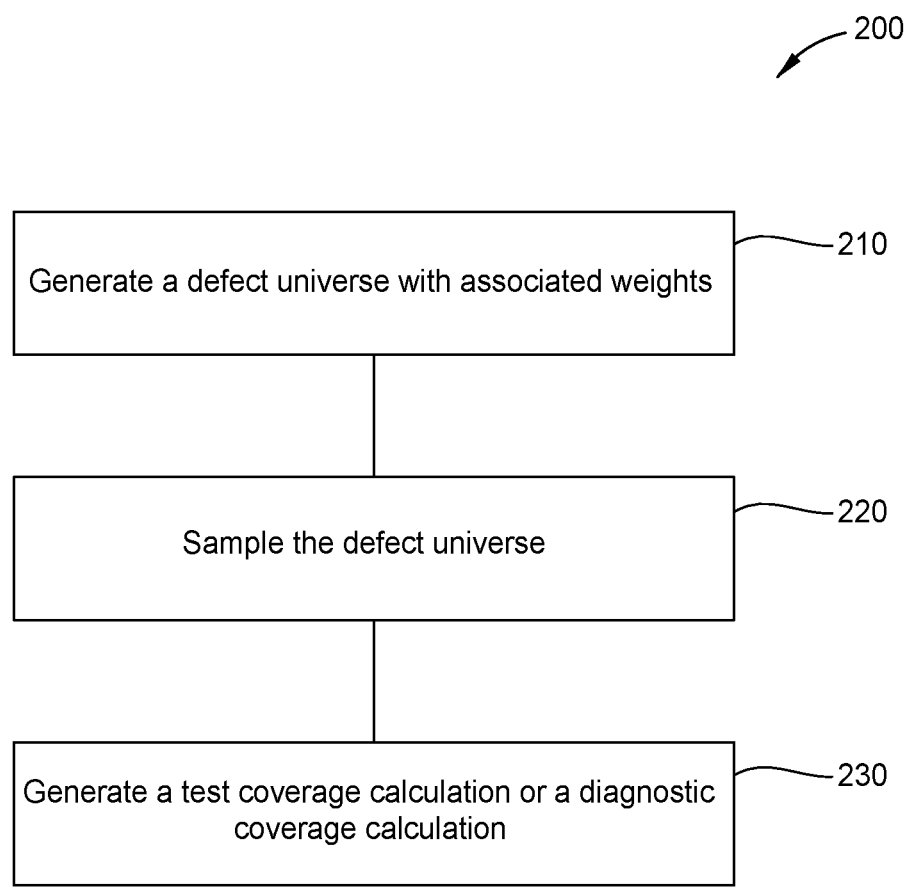
FIG. 2 depicts a flowchart of generating sampling error data for simulating circuits, in accordance with some embodiments of the present disclosure.

FIG. 2 illustrates a flow chart of a method 200 for analog defect or fault coverage estimation utilizing sampling. The method 200 may be performed by the computer system 100. At operation 210, a defect universe with associated weights are generated. For example, the coverage scenario module 110 utilizes defect likelihood information, circuit netlist information, and a defect model to generate a defect universe and weights for each of the defects within the defect universe. The defect likelihood information, the circuit netlist information, and the defect model are stored within the memory 140 and accessed by the coverage scenario module 110 to generate the defect universe. Generating the defect universe and weights are described in greater detail with regard to FIG. 4.

At operation 220, the defect universe is sampled using a sampling algorithm based on a sampling size. For example, the sampling module 120 samples the defect universe using a sampling algorithm based on one or more sampling sizes. The sampling algorithm and sampling size or sizes are stored within the memory 140 and accessed by the sampling module 120 to sample the defect universe. Example sampling algorithms include a simple random sample algorithm, a stratified sampling algorithm, a cluster sampling algorithm, a multistage sampling algorithm, and a systematic random sampling algorithm, among others. In one example, each sampling size is stored within the memory 140. One or more of the sampling sizes may be provided by a user of the computer system 100. The sampling sizes may be in a range of 10 samples to 3200 samples. However, in other examples, more than 3200 samples may be used. The sampled defect universe is stored within the memory 140. In one example, sampling the defect universe generates one or more sampled defect universes that are used by a circuit simulation process to simulate defects or faults within a CUT.

At operation 230, a test coverage calculation or a diagnostic coverage calculation is generated. For example, the confidence module 130 generates the test coverage calculation for a test coverage scenario or a diagnostic coverage calculation for a diagnostic coverage scenario based on a coverage type (e.g., a test coverage or a diagnostic coverage). The coverage type may be stored within the memory 140 and accessed by the confidence module 130 to generate the test coverage calculation or a diagnostic coverage calculation from the sampled defect universe.

As will be described with regard to FIG. 4, a confidence interval for each of the sampled defect universes may be determined before operation 230 and before the test coverage calculation or the diagnostic coverage calculation is generated. In one example, determining the confidence interval for the sampled defect universe may occur after operation 220 and before operation 230, which allows for the determination of an accurate estimate of a corresponding error value before performing the simulations on the CUT. Accordingly, a sampling size may be selected to ensure that there is a high confidence that the simulation process will meet the accuracy goals and processing time of the simulation process.

Figure 3:
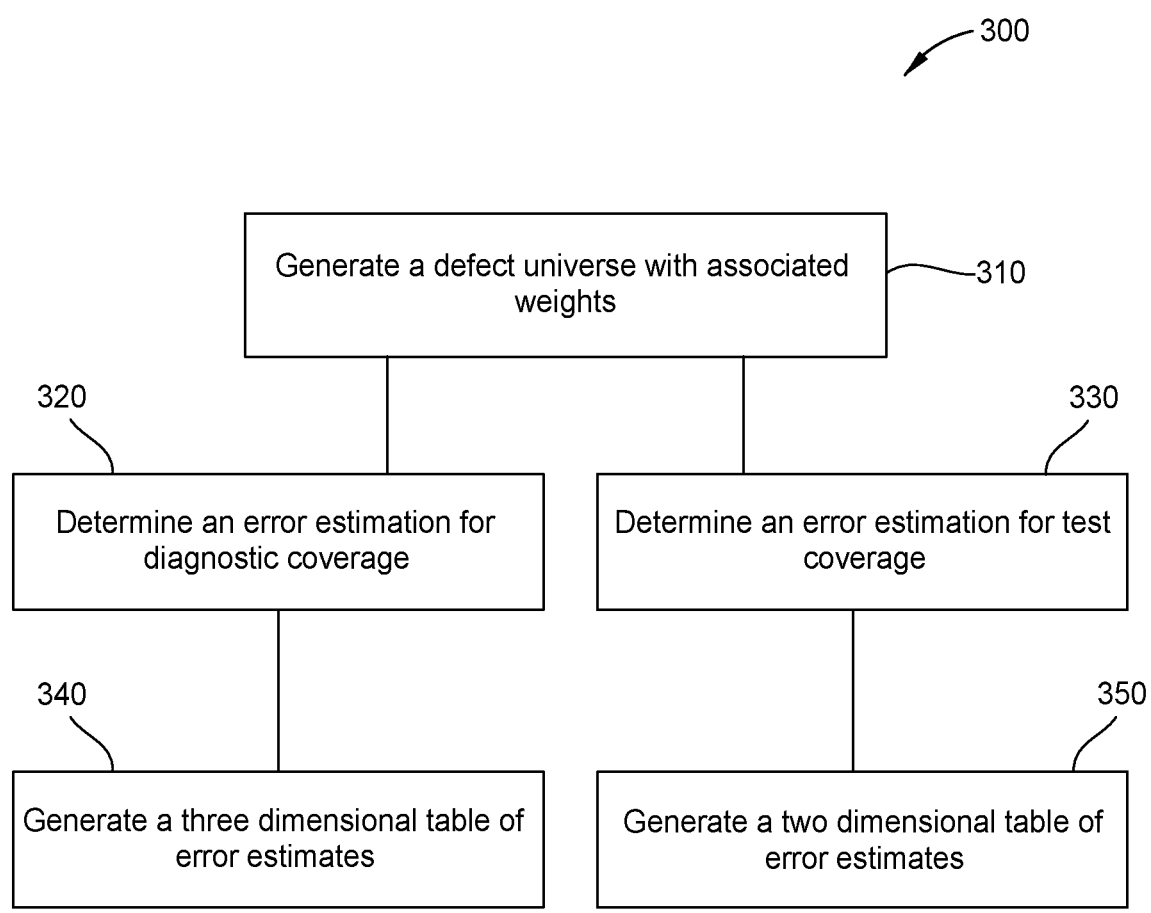
FIG. 3 depicts a flowchart of generating sampling error data for simulating circuits, in accordance with some embodiments of the present disclosure.

FIG. 3 illustrates a flowchart of a method 300 for providing error estimations both for test coverage and for diagnostic coverage for various sampling sizes based on a circuit's actual defect universe and the sampling method, according to one or more examples. The method 300 may be performed by the computer system 100. In one example, the method 300 omits any processes corresponding to simulation. For example, computational statistical methods may be used to generate the error estimations of the test coverage and diagnostic coverage. At operation 310, a defect universe is generated based on a defect likelihood information, defined defects, and/or circuit netlist information. For example, the coverage scenario module 110 generates the defect universe. At operation 320, an error estimate is generated for diagnostic coverage. At operation 330, an error estimate is determined for test coverage. At operation 340, a three dimensional table of error estimates is generated from the output of operation 320. For example, the confidence module 130 generates the three dimensional table of errors from error estimates of the diagnostic coverage. The three dimensional table is defined by the parameters test coverage, sampling size, and diagnostic coverage. The three dimensional error bound table may be output to a user via a display device (e.g., the video display unit 1210 of FIG. 12) such that a sampling size may be selected to be used for simulation of a CUT. In another example, the three dimensional error bound table is provided to a defect simulator (e.g., circuit simulator) which selects the sampling size to be used for simulation of a CUT. At operation 350, a two dimensional table of error estimates is generated from the output of operation 330. For example, the confidence module 130 generates the two dimensional error bound table of errors from error estimates of the diagnostic coverage. The two dimensional error bound table is defined by the parameters test coverage and sampling size. The two dimensional error bound table may be output to a user via a display device (e.g., the video display unit 1210 of FIG. 12) such that a sampling size may be selected to be used for simulation of a CUT. In another example, the two dimensional error bound table is provided to a defect simulator (e.g., circuit simulator) which selects the sampling size to be used for simulation of a CUT. In one example, the operations 320 and 330 may at least partially overlap in time such that at least a portion of the operations 320 and 330 are completed in parallel (e.g., during an overlapping period of time). Further, the operations 340 and 350 at least partially overlap in time such that at least a portion of the operations 340 and 350 are completed in parallel (e.g., during an overlapping period of time).

Figure 4:
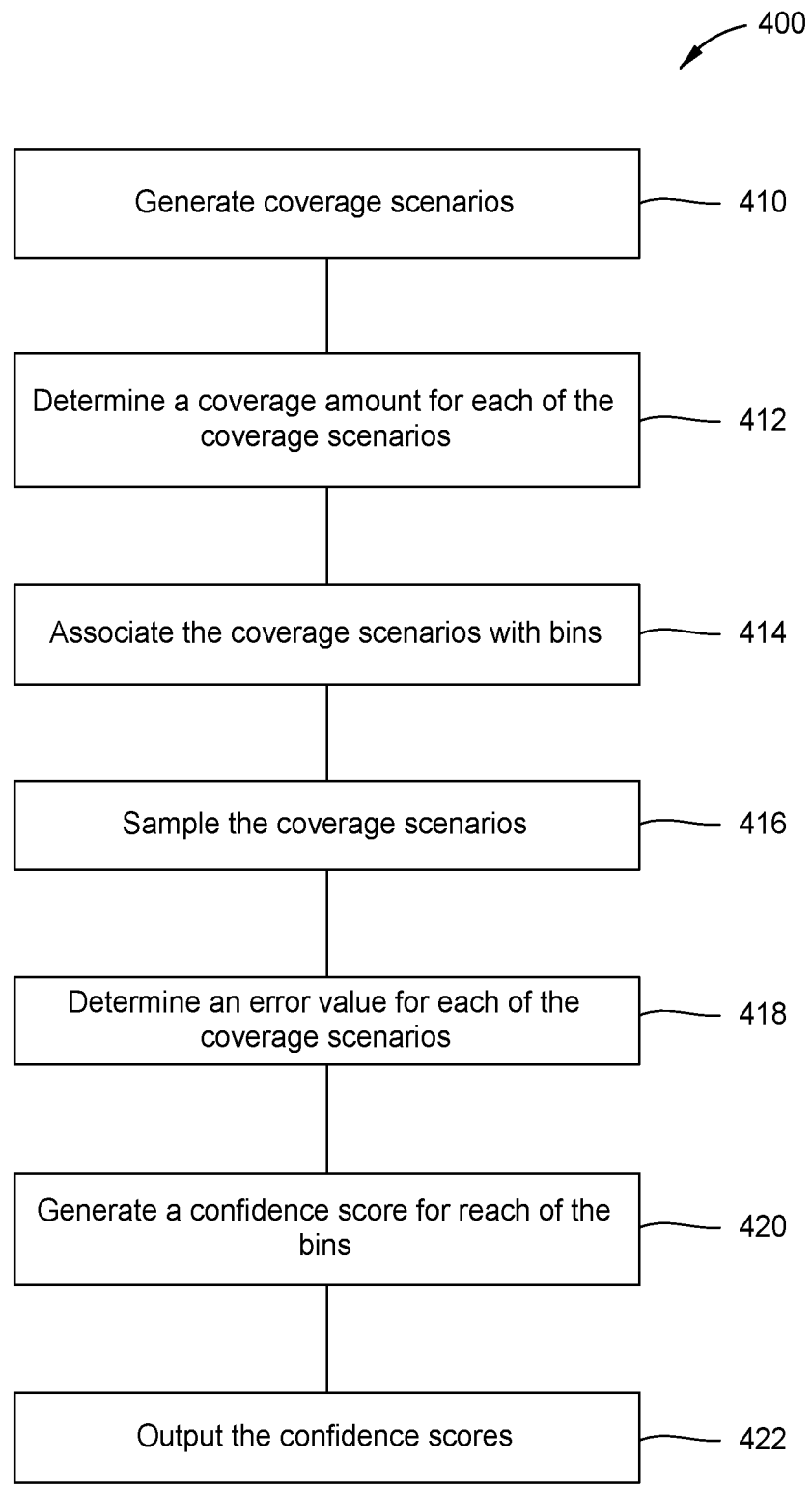
FIG. 4 depicts a flowchart of generating sampling error for simulating circuits, in accordance with some embodiments of the present disclosure.

FIG. 4 illustrates a flowchart of a method 400 for guiding sampling size choice for analog defect simulation, according to one or more examples. The method 400 may be implemented by the computer system 100. In one example, the method 400 is implemented as a special mode in any defect or fault simulator. For example, the method 400 may be implemented by a processor a circuit simulator. The method 400 may be implemented within a host system (e.g., the host system 1107 of FIG. 11) and/or instructions (e.g., the instructions 1226 of FIG. 12) stored in a memory (e.g., the main memory 1204 of FIG. 12) or a machine-readable medium (e.g., the machine-readable storage medium 1224 of FIG. 12) executable on one or more processing devices (e.g., the processing device 1202 of FIG. 12). Further, operations 410-420 of the method 400 may be performed as part a process (e.g., the set of processes 1000 of FIG. 10) used during the design, verification, and fabrication of an IC. For example, the operations 410-420 of the method 400 may be performed as part of synthesis and design for test (e.g., process 1016 of FIG. 10).

At operation 410, coverage scenarios are generated. In one example, the coverage scenario module 110 of FIG. 1 generates the coverage scenarios based on a defect universe. The defect universe is based on one or more of defect likelihood information, circuit netlist information, and a defect model. The coverage scenario module 110 randomly generates the coverage scenarios from the defect universe. The coverage scenario module 110 may randomly generate thousands of coverage scenarios. The coverage scenarios may be generated in one or more different ways. In one example, each of the coverage scenarios may be generated in a common way. In another example, one or more of the coverage scenarios may be generated in multiple ways. The generated coverage scenarios are stored within the memory 140.

In one example, a defect universe is a randomly permuted array of size $N_f$ defects. When generating a coverage scenario from the defect universe, the covered defects $N_c$ correspond to defects within the defect universe that are marked as covered. The covered defects $N_c$ are the defects that are in included within the coverage scenario. In one example, the covered defects $N_c$ is a uniform random number between 0 and $N_f$. In another example, each defect within the defect universe may be randomly marked as covered or un-covered according to a distribution of defects. In one example, a coverage scenario is generated from a defect universe based on a target number of defects for coverage (e.g., a uniform random number between 0 and 100, inclusive) is set and coverages are then randomly assigned to each defect within the defect universe until the target number of defect for coverage is met.

In one example, the type of coverage is diagnostic coverage. In such an example, a subset $N_d$ of the covered defects $N_c$ are randomly chosen and marked as diagnostically covered. The defects of the subset $N_d$ may be referred to as dangerous defects.

In one example, the coverage scenarios corresponding to test coverage (e.g., test coverage scenarios) are generated during non-overlapping periods or at least partially overlapping periods of time.

At operation 412 of the method 400, the coverage amount of each of the coverage scenarios is determined. For example, the coverage scenario module 110 of FIG. 1 determines the coverage amount of each of the coverage scenarios. The coverage amount is associated with test coverage or a diagnostic coverage. The coverage amount associated with the test coverage scenarios corresponds to the percentage of the weighted defects having effects observable at outputs of the CUT. In one example, as each of the possible defect has a different likelihood of occurrence, the relative likelihood of a defect is represented by a numerical weight factor for each defect. For example, if a first defect is ten times more likely to occur than a second defect, then the first defect's weight will be ten times higher than the weight of the second defect. The coverage amount associated with the diagnostic coverage scenarios is the percentage of the dangerous defects having effects observable at the outputs of the safety mechanism of the CUT. In one example, the safety mechanism detects faults and/or control failures to achieve or maintain a safe state within the corresponding IC. Dangerous defects are the defects which cause a circuit's behavior at its output ports to be incorrect, which, from a functional point-of-view is considered to be dangerous. In one example, a coverage amount for the test coverage scenarios (e.g., a weighted test coverage for a test coverage type) is calculated by:

$$100 * \frac{\sum_{i=1}^{N_f} \omega_i * C_i}{\sum_{i=1}^{N_f} f_i}.$$

Equation 1

The variable $\omega_i$ is the weight of the i'th defect. The variable $C_i$ is 1 if the i'th defect is covered or 0 if i'th defect is not covered. The variable $N_f$ is the total number of defects or faults in the defect universe.

In one example, a coverage amount for the diagnostic coverage scenarios (e.g., a weighted diagnostic coverage for a diagnostic coverage type) is calculated by:

$$100 * \frac{\sum_{i=1}^{N_c} \omega_i * C_i}{\sum_{i=1}^{N_c} \omega_i}.$$

Equation 2

In equation 2, the variable $\omega_i$ is the weight of the i'th defect. Further, the variable $C_i$ is 1 if the i'th defect is diagnostically covered (e.g., detected by safety mechanism) or 0 if the i'th defect is not diagnostically covered. The variable $N_c$ is the total number of dangerous defects.

At operation 414 of the method 400, bins are associated with the coverage scenarios. For example, the coverage scenario module 110 associates each of the coverage scenarios with a bin of a plurality of bins. As the coverage scenario space is sampled randomly, the coverage amounts (e.g., weighted coverage numbers) uniformly or non-uniformly span from 0 percent to 100 percent based on the of the weight distribution of the defects. In one example, each of the bins of the plurality of bins has a size of 2 percent. In such an example, bins of 0 percent, 2 percent, 4 percent, . . . , 96 percent, 98 percent, and 100 percent are used. In other examples, the bin size is greater than or less than 2 percent. As the bin size decreases, the computational cost can increase proportionately to the increase in the number of coverage scenarios. In one example, 10,000 coverage scenarios are utilized, and under uniform weights, each bin size is expected to have approximately 200 coverage scenarios ($\approx 10000/51$). In such an example, the number of coverage scenarios is able to provide an accurate error bound estimation for each bin. In other examples, more than or less than 200 coverage scenarios are enough to provide an accurate error bound estimation for each bin. Binning is applied to both the test coverage scenarios and diagnostic coverage scenarios. In one example, binning, as described above, is applied to the test coverage scenarios independent from the diagnostic coverage scenarios such that first bins of test coverage scenarios are created and second bins of diagnostic coverage scenarios are created.

At operation 416 of the method 400, the coverage scenarios are sampled. For example, the sampling module 120 of FIG. 1 samples the coverage scenarios (e.g., the test coverage scenarios and/or the diagnostic coverage scenarios) with a sampling algorithm at one or more sampling sizes. Sampling the coverage scenarios generates sampled coverage scenarios. The sampling algorithm used to choose the defects is applied to each of the coverage scenarios (e.g., the test coverage scenarios and/or the diagnostic coverage scenarios) within each of the bins of the test coverage scenarios and/or the diagnostic coverage scenarios for each sampling size. Example sampling algorithms include simple random sampling, stratified sampling, cluster sampling, multistage sampling, and systematic random sampling, among others. Sampling the coverage scenarios generates sampled coverage scenarios having a reduced number of defects for each sampling size. The smaller the sampling size, the greater the reduction in the number of defects.

The number of sampling sizes used to sample the coverage scenarios may be two or more. For example, the number sampling sizes include two or more sampling sizes selected from the group consisting of a range of samples between 10 samples-3200 samples. In one example, the number sampling sizes include two or more sampling sizes selected from the group consisting of 10 samples, 100 samples, 200 samples, 400 samples, 800 samples, 1600 samples, and 3200 samples. Further, the number of samples sizes may correspond to a percentage of the total defects within the defect universe. For example, the sampling size may be 80 percent of the total defects in a defect universe. In other examples, the sampling size may be less than 80 percent or greater than 80 percent of the total defects in a defect universe.

In one example, during operation 416, the coverage scenarios (e.g., the test coverage scenarios and/or the diagnostic coverage scenarios) are sampled with multiple sampling sizes during non-overlapping periods of time. For example, the coverage scenarios (e.g., the test coverage scenarios and/or the diagnostic coverage scenarios) are serially sampled with multiple sampling sizes. In another example, during operation 416, the coverage scenarios (e.g., the test coverage scenarios and/or the diagnostic coverage scenarios) are sampled with multiple sampling sizes during at least partially overlapping periods of time. For example, the coverage scenarios (e.g., the test coverage scenarios and/or the diagnostic coverage scenarios) are sampled with multiple sampling sizes at least partially in parallel with each other. The test coverage scenarios may be sampled with the same sampling sizes and/or sampling algorithm as the diagnostic coverage scenarios. In another example, the test coverage scenarios are sampled with one or more different sampling sizes and/or a different sampling algorithm as the diagnostic coverage scenarios.

At operation 418 of the method 400, an error value for each of the coverage scenarios is determined. In one example, the confidence module 130 determines an error value for each coverage scenario. In one example, the error value corresponds to an error between sampled coverage and actual coverages for the coverage scenarios in each bin. The error values are stored within the memory 140.

In one example, for each bin, two arrays are generated. For example, a first array of size M for storing sorted maximum negative errors and a second array of size N for storing sorted maximum positive errors are generated. M and N may have a value of 10. In another example, M and/or N may be less than or greater than 10. In one example, the positive and negative arrays are used to store the max positive and/or negative sampling errors for a given coverage scenario (e.g., target). For example, for a coverage scenario of 50 percent has a positive error array (e.g., 1 percent, 2 percent, or 3 percent) and a negative error array (e.g., −1 percent, −2 percent, or −3 percent). In one example, the coverage amounts (e.g., values) and sampling errors are determined for two or more trials, and the top and bottom 5 percent are used to determine the 95 percent confidence interval. In one example, the size of M and the size of N are selected such that for a given number of trials, a 95 percent confidence interval can be determined. In one example, for 10,000 trials, there are 200 sampling error results per coverage scenario (e.g., 2 percent, 4 percent, . . . , 98 percent). In such an example, an array size of ten for both M and N is able to determine the 95 percent interval, as 200×5%=10. In one example, an array for negative errors with +100 percent and the positive errors with −100 percent is initialized.

An error value is calculated for each coverage scenario of each bin based on: "sampled_test_coverage−actual_test_coverage" and/or "sampled_diagnostic_coverage−actual_diagnostic_coverage". In various embodiments, the error value for each coverage scenario is determined based on a difference between the number of defects in a sampled coverage scenario and the number of defects in a corresponding non-sampled coverage scenario. The difference may be determined by subtracting the number of defects in the non-sampled coverage scenario from the number of defects in the corresponding sampled coverage scenario. Additionally and/or alternatively, other methods may be used to determine the difference between sampled coverage scenario and the coverage scenario. The confidence module 130 stores the error values within the memory 140. The error value for each coverage scenario may be calculated during at least partially overlapping periods of time or non-overlapping periods of time.

At operation 420 of the method 400, the confidence score for each of the bins is generated. For example, the confidence module 130 determines a confidence score (e.g., interval) for each of the bins. In one example, determining the confidence score includes identifying (e.g., locating) the bins associated with the error values determined at operation 418. In each of the bins, the error value is compared with maximum negative error value and a maximum positive error value to determine if the error value of a bin may be categorized in a group of bins corresponding to the highest error values. The group of bins corresponding to the highest error values may consist of Z bins having the highest error values. Z may be ten or more. In other examples, Z is less than ten.

In one example, upon the completion of determining an error value for each bin, two or more of the error values are dropped (omitted) and are not used in determining the confidence score. For example, based on the number of sampled coverage scenarios in a bin, the bottom M and top N of the errors are dropped and not used in determining the confidence score for that bin. M and N may be about 2.5 percent of the total sampled coverage scenarios in a bin. In other examples, one or more of M and N is greater than or less than 2.5 percent. In one example, less than 10 of the error values are dropped if the number of sampled coverage scenario was such that an average of 200 sampled coverage scenarios were included in each bin to achieve the 95 percent confidence interval. To determine the confidence score (e.g., confidence interval) for a bin, the confidence module 130 uses the extreme values (e.g., maximum value and minimum value) of the error values (e.g., an error array) for the bin. In one example, the confidence module 130 uses the extreme values of an error values for a bin to determine the 95 percent confidence value for a bin. In one example, the 95 percent confidence interval means that the range or errors is expected 95 percent of the time. In one example, the error values (e.g., error array) stores the max positive and negative sampling errors for each coverage scenario. After dropping the top 2.5 percent of error values from each array, and leaving the middle 95 percent of the error values, the minimum and maximum of the negative and positive arrays are used as confidence interval. For example, let 2.5 percent of the bin count equal 2, and the arrays at [−4 percent, −3 percent, −2 percent, −1 percent] and [4 percent, 3 percent, 2 percent, 1 percent]. After dropping top 2.5 percent values, the remaining arrays are [−2 percent, −1 percent] and [2 percent, 1 percent]. Accordingly, the final confidence interval is [−2 percent, 2 percent].

In examples where the number of sampled coverage scenarios within a bin is below a coverage scenario threshold, a warning that the data may be insufficient to generate a correct error estimate is created and output. The confidence module 130 may determine that the number of sampled coverage scenarios of a bin is below the coverage scenario threshold, generates a warning message, and communicates the warning message to be displayed on a display device. The coverage scenario threshold may have a value of 100, 200, or 300, or values in a range between about 100 and about 300. In other examples, the coverage scenario threshold may have a value greater than 300 or less than 100.

FIGS. 5A-5C illustrate example pseudocode 500 for operations 410-420. The pseudocode 500 may be executed as instructions by the coverage scenario module 110, the sampling module 120, and the confidence module 130 of FIG. 1. At portion 510 of the pseudocode 500, the coverage type is determined to be test coverage or a diagnostic coverage. In one example, the coverage scenario module 110 determines the coverage type based on the value of the variable trial size. At portion 512 of the pseudocode 500, the coverage scenarios are generated for the coverage type, the weights (e.g., coverage amounts) for the coverage scenarios are determined, and the coverage scenarios are associated with bins. For example, the coverage scenario module 110 generates the coverage scenarios for the coverage type. Further, the coverage scenario module 110 determines a weight for each of the coverage scenarios and associates each coverage scenario with a bin based on the weight (e.g., coverage amount) of the coverage scenarios.

At portion 514 of the pseudocode 500, each of the coverage scenarios are sampled based on one or more sampling size and a sampling algorithm. For example, the sampling module 120 samples each of the coverage scenarios using a sampling algorithm and based on a sampling size. At portion 516 of the pseudocode 500, an error value for each of the coverage scenarios is determined. For example, the confidence module 130 determines an error value for each of the coverage scenarios of each of the bins.

At portion 518 of the pseudocode 500, a confidence value for each of the bins is determined for the coverage type test coverage. For example, the confidence module 130 determines a confidence value for each of the bins based on the error values of the coverage scenarios within each bin for the coverage type test coverage. In one example, the confidence module 130 further determines whether or not the bins include sufficient data (e.g., a number of coverage scenarios greater than a coverage scenario threshold) to determine the confidence value for each of the bins. In examples, where a bin has insufficient data (e.g., a number of coverage scenarios less than a coverage scenario threshold), insufficient data is determined and a warning message may be presented.

At portion 520 of the pseudocode 500, a confidence value for each of the bins is determined for the coverage type diagnostic coverage. For example, the confidence module 130 determines a confidence value for each of the bins based on the error values of the coverage scenarios within each bin for the coverage type diagnostic coverage. In one example, the confidence module 130 further determines whether or not the bins include sufficient data (e.g., a number of coverage scenarios greater than a coverage scenario threshold) to determine the confidence value for each of the bins. In examples, where a bin has insufficient data (e.g., a number of coverage scenarios less than a coverage scenario threshold), insufficient data is determined and a warning message may be presented.

With further reference to the method 400 of FIG. 4, at 422 of the method 400, the confidence scores are output. In one example, the confidence module 130 or another element of the computer system 100 outputs the confidence score for each bin to be displayed on a display (e.g., the video display unit 1210 of FIG. 12), printed, or communicated to another computing system via a network device (e.g., the network interface device 1208 and network 1220 of FIG. 12). Additionally, or alternatively, the confidence score for each bin may be provided (e.g., transmitted or communicated) to another processing system (e.g., a circuit simulation system) or element of the computer system 100. In one example, with reference to tables 600 and 800 of FIGS. 6 and 8, the error margin is a 95 percent confidence interval. Each table 600 and 800 contains results for all the coverage scenarios generated with a single sample size and shows the error margin for a given coverage percentage. For example, the table 600 of FIG. 6 illustrates that for some arbitrary sample size (e.g., a sample size of 100), the error margin is [−7.0 percent, 6.4 percent] for a 40 percent coverage scenario. In such an example, for 95 percent of the time, for the given sample size, the coverage result will vary between 33 percent and 46.4 percent if the expected coverage is 40 percent.

The output comprises the coverage targets and associated error margins for each sampling size. In one example, the output is provided to a fault simulator, and the fault or defect simulator selects a coverage amount (e.g., coverage target) to be used for simulation of a circuit. FIG. 6 illustrates an example output (e.g., table 600) for the coverage type test coverage. In FIG. 6, the table 600 has been divided into two portions for ease of viewing. The table 600 includes the results for a single sampling size, e.g., a sampling size of 100. In other examples, the output may include additional tables including results for each different sampling size. The table 600 includes respective error margins generated for one or more sampling sizes for the sampling size of 100. The error margin is the confidence interval and is the range by which an observed value can differ from its expected value. For example, for 100 samples and 50 percent coverage, let the error margin be −1 percent to 1 percent error, and [−1%, 1%] is the error margin. Consequently, 95 percent of the time, for 100 samples and a 50 percent expected coverage, coverages between 49 percent and 51 percent will be observed. The table 600 illustrates the relationship between each coverage amount (e.g., coverage percentage), respective error margins, and the count of positive and negative error values in that bin. Each row of the table corresponds to a different bin. The count of positive and negative error values for a bin corresponds to the number of coverage scenarios within a bin that correspond to a negative error value and a number of coverage scenarios within bin that correspond to a positive error value. Each bin is associated with a different coverage scenario (percentage). The negative and positive bin array is the bin array for the maximum negative and positive sampling errors for each coverage scenario (e.g., 2 percent, 4 percent, . . . , 98 percent). Various coverage scenarios are generated and the sampling error results are stored in the bins of the negative and positive bin array. Once all the coverage scenarios have been generated and all the sampling errors stored within the corresponding bins, the top 2.5 percent error values from each bin is dropped. Further, the max negative/positive values left in bins are used as the 95 percent confidence interval (e.g., error margin). The negative and positive bin count is used to determine how many of the top values need to be dropped to get a 95 confidence interval. For example, for a negative bin count of 80 and a positive bin count of 120, dropping the top 5 percent from each is the same as dropping the top/bottom 2.5 percent from a combined array. Accordingly, in such an example, the top 80*0.05 or 4 values from the negative bin are dropped and the top 120*0.05 or 6 values from the positive bin are dropped. Each row of the table corresponds to a different bin. Each bin is associated with a different coverage scenario (percentage).

Figure 7:
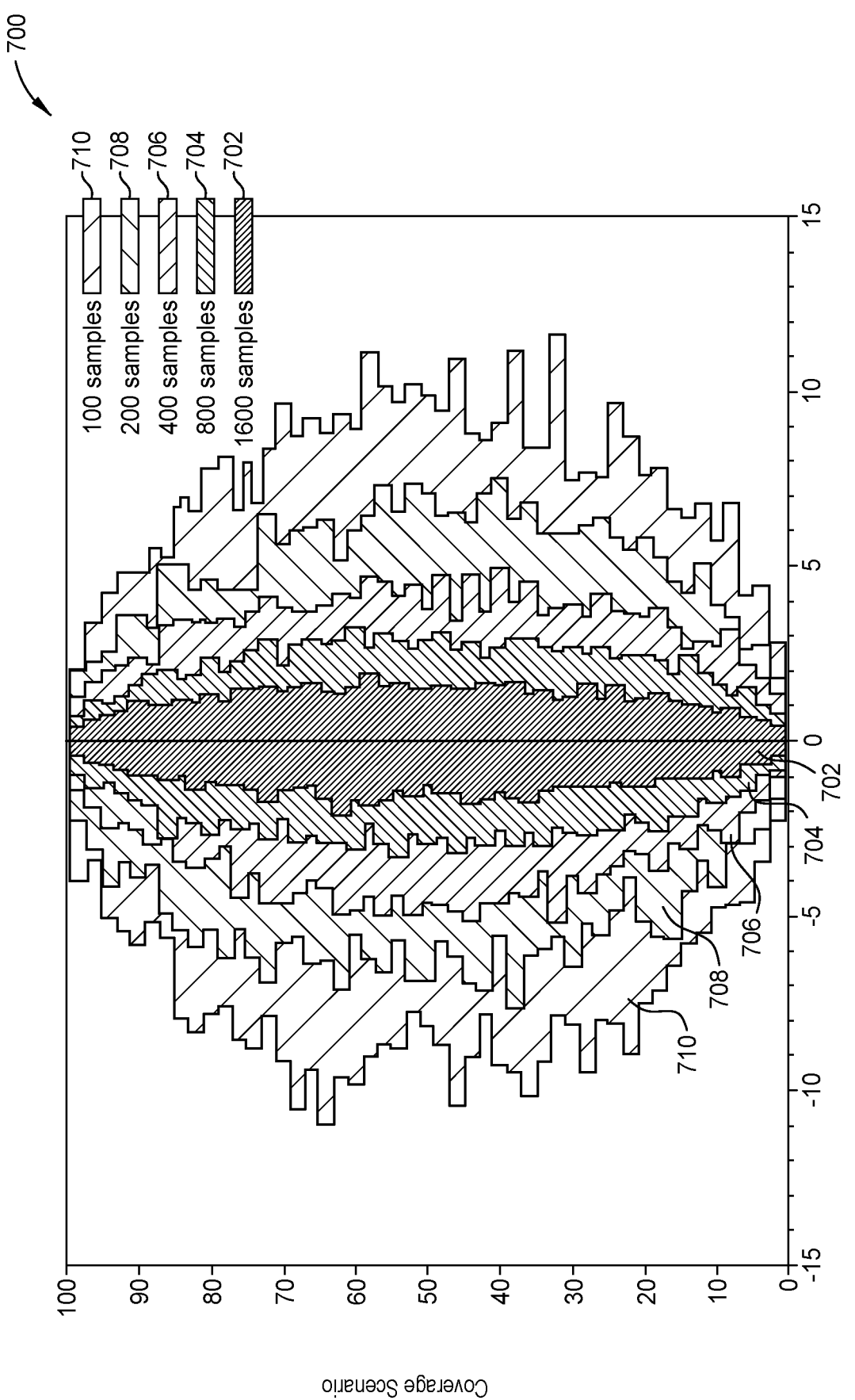
FIG. 7 depicts a graph of test coverage errors generated from sampled test coverage scenarios, in accordance with some embodiments of the present disclosure.

FIG. 7 illustrates a graph 700 of estimated errors for the test coverage scenarios at different sampling sizes. The graph 700 illustrates the error percentage along the X axis for different sampling sizes at different coverage scenarios (e.g., coverage percentages) along the Y axis. A sampling size of 1600 samples corresponds to region 702, a sampling size of 800 corresponds to region 704, a sampling size of 700 corresponds to region 706, a sampling size of 200 corresponds to region 708, and a sampling size of 100 corresponds to region 710. As is illustrated by the graph 700, for a coverage scenario, the magnitude of the expected error percentage increases as the sampling size decreases. However, for some coverage scenarios, the magnitude of the expected error percentage for a lower sampling size is less than the magnitude expected error percentage for a higher sampling size of a different coverage scenario. Accordingly, in some instances it is possible to select a lower sampling size with a lower expected error percentage.

FIG. 8 illustrates an example table 800 for the coverage type diagnostic coverage. The table 800 has been divided into two portions for ease of viewing. The table 800 includes the results for a single sampling size, e.g., a sampling size of 100, and test coverage percentage (e.g., 24 percent). In other examples, the output may include additional tables including results for each different sampling size and/or test coverage target. The table 800 illustrates the relationship between each coverage amount (e.g., coverage percentage), respective error margins, and the count of positive and negative error values in that bin. The count of positive and negative error values for a bin corresponds to the number of coverage scenarios within a bin that correspond to a negative error value and a number of coverage scenarios within a bin that correspond to a positive error value. Each row of the table corresponds to a different bin. Each bin is associated with a different coverage scenario (coverage percentage).

Figure 9:
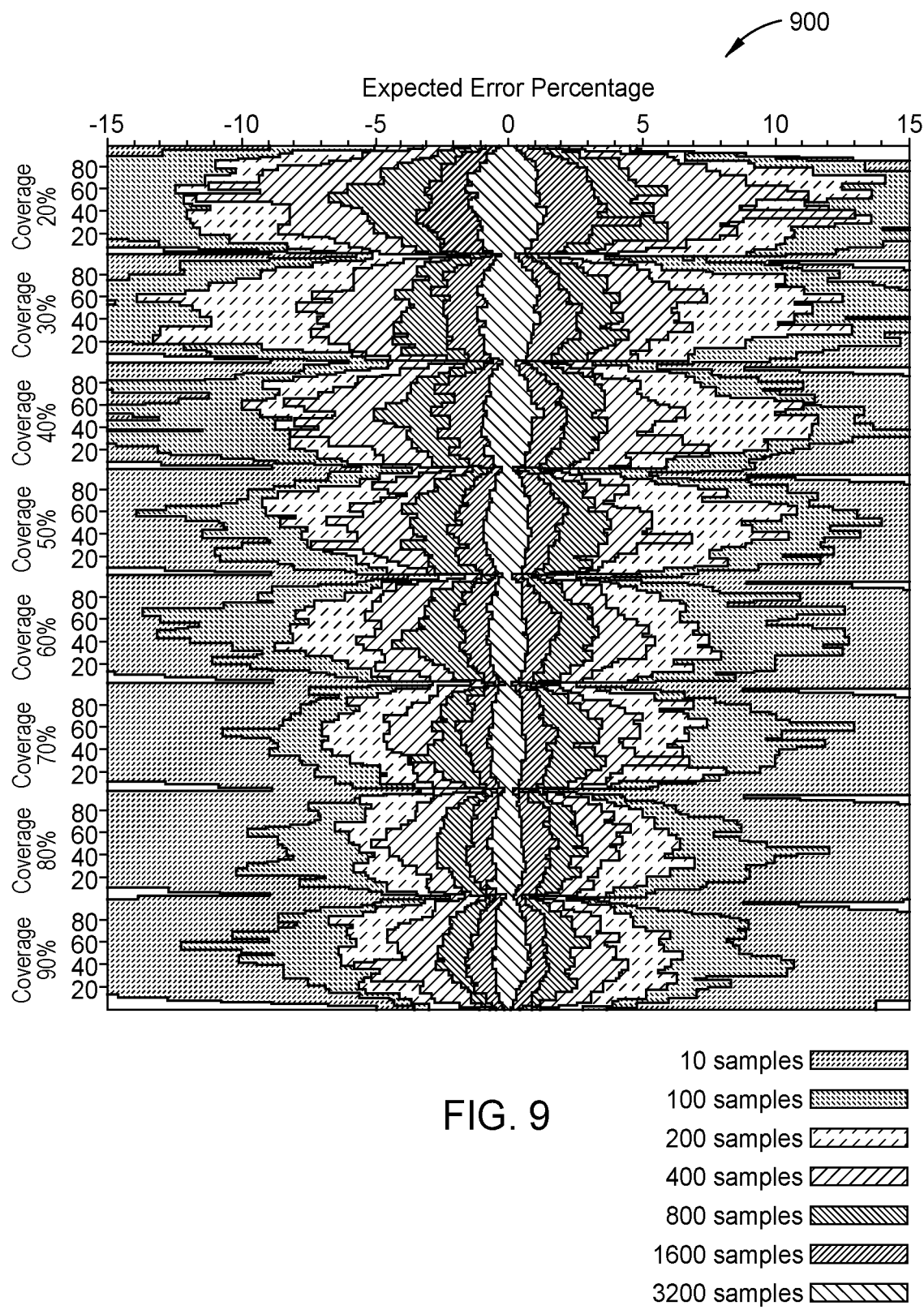
FIG. 9 depicts a graph of test coverage errors generated from sampled diagnostic coverage scenarios, in accordance with some embodiments of the present disclosure.

FIG. 9 illustrates graphs 900 of estimated errors for different sampling sizes. For example, FIG. 9 illustrates estimated sampling errors for diagnostic coverages at different sampling sizes is illustrated. In the example of FIG. 9, the estimated error percentage for sampling sizes of 3200 samples, 1600 samples, 800 samples, 400 samples, 200, samples 100 samples, and 10 samples at different coverage percentages is illustrated. The graphs 900 of FIG. 9 compare the expected error percentage (Y axis) for the different sampling sizes with different coverage scenarios (X axis). As can be seen from FIG. 9, the expected error percentage is less for 3200 samples than that of 10 samples. For each coverage scenario, the magnitude of the expected error percentage increases as the sampling size decreases. However, for some coverage scenarios, the magnitude expected error percentage for a lower sampling size is less than the magnitude expected error percentage for a higher sampling size of a different coverage scenario. Accordingly, in some instances it is possible to select a lower sampling size with a lower expected error percentage.

The tables indicating the coverage percentage, error margin, and negative and positive bin count for each sampling size are displayed on a display (e.g., the video display unit 1210 of FIG. 12), printed, and/or provided to another processing system. For example, the tables may be provided to a simulation processing system for circuit simulation. In one example, a sampling size is selected based on the coverage percentage, error margin, and negative and positive bin count and used for simulation of the defects for a CUT. In another example, multiple sampling sizes, but less than the total number of sampling sizes are selected based on the coverage percentage, error margin, and negative and positive bin count and used for simulation of the defects for a CUT. For example, a simulation processing system may select one or more sampling sizes based on the error margin, and negative and positive bin count for the coverage percentage such that the corresponding defect simulation process for a CUT meet the accuracy goals and processing time of the simulation process.

In one example, a 95 percent confidence interval for a given sample size and coverage scenario is generated. A table (e.g., table 600 of FIG. 6 and table 800 of FIG. 8) is generated for each sample size which shows the error margin for each coverage scenario. This information may be used by a user or another processing system to determine the number of samples to select. For example, the tables may be used to determine the fewest number of samples needed to achieve a +/−1 percent error margin. In another example, due to limited available processing resources, the error margin for 400 samples may be determined from the tables. In addition to, or alternatively to, using the tables to determine the number of samples to select, the graph 700 of FIG. 7 and the graphs 900 of FIG. 9 may be used to identify the error margins for different sample sizes coverage percentages. For example, two or more of the error margins may be overlaid in one graph, making it easier to gauge how different error margins for different sample sizes compare to each other. Combined with the tables, the graphs may increase the efficiency that a sample size is selected.

Figure 10:
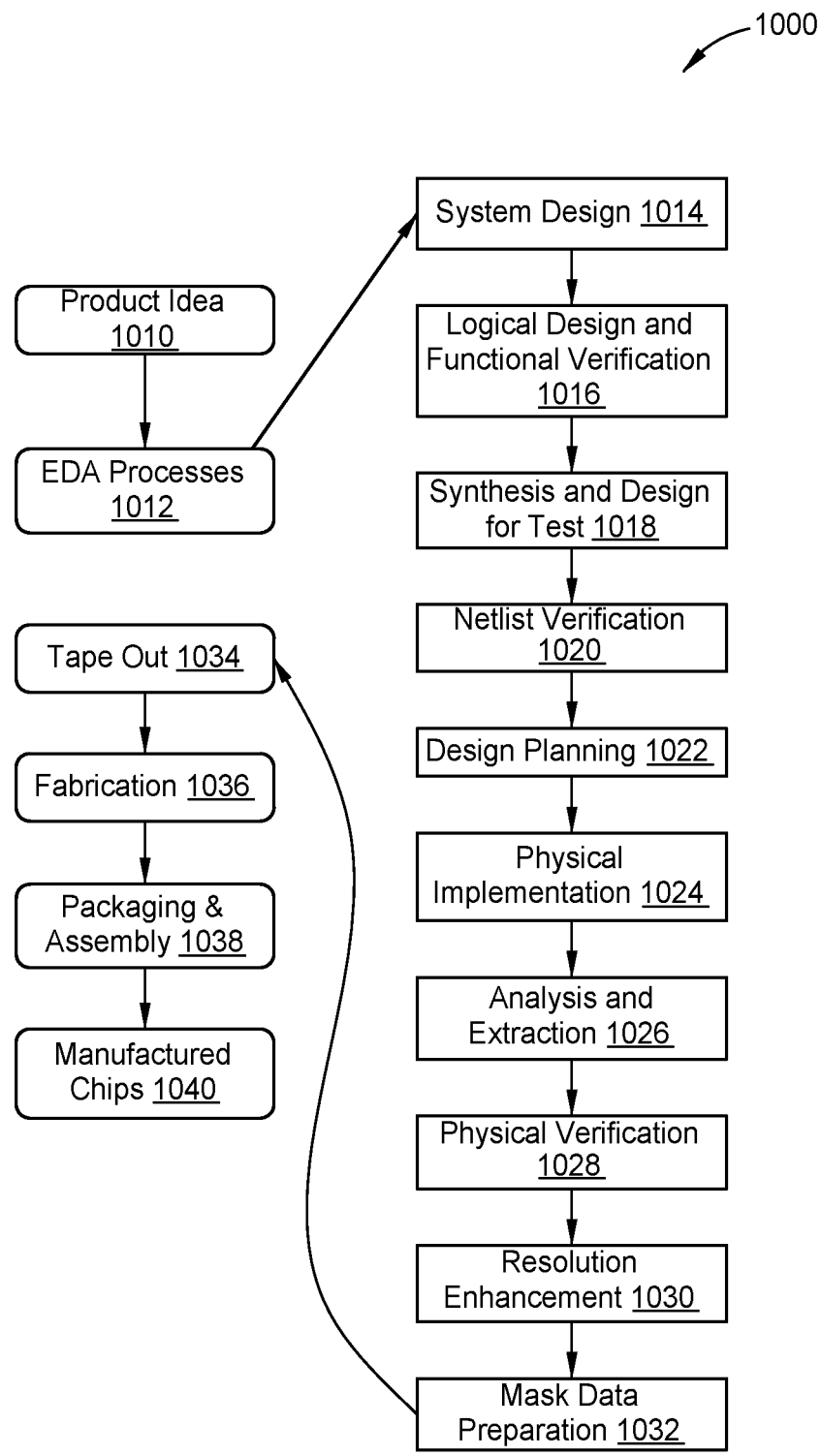
FIG. 10 depicts a flowchart of various processes used during the design and manufacture of an integrated circuit in accordance with some embodiments of the present disclosure.

FIG. 10 illustrates an example set of processes 1000 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1010 with information supplied by a designer, information which is transformed to create an article of manufacture that uses a set of EDA processes 1012. When the design is finalized, the design is taped-out 1034, which is when artwork (e.g., geometric patterns) for the integrated circuit is sent to a fabrication facility to manufacture the mask set, which is then used to manufacture the integrated circuit. After tape-out, a semiconductor die is fabricated 1036 and packaging and assembly processes 1038 are performed to produce the finished integrated circuit 1040.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 10. The processes described by be enabled by EDA products (or tools).

During system design 1014, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification process 1016, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1018, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1020, the netlist is checked for compliance with timing constraints and for correspondence with the HDL code. During design planning 1022, an overall floor plan for the integrated circuit is constructed and analyzed for timing and top-level routing.

During layout or physical implementation 1024, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1026, the circuit function is verified at the layout level, which permits refinement of the layout design. During physical verification 1028, the layout design is checked to ensure that manufacturing constraints are correct, such as DRC constraints, electrical constraints, lithographic constraints, and that circuitry function matches the HDL design specification. During resolution enhancement 1030, the geometry of the layout is transformed to improve how the circuit design is manufactured.

During tape-out, data is created to be used (after lithographic enhancements are applied if appropriate) for production of lithography masks. During mask data preparation 1032, the 'tape-out' data is used to produce lithography masks that are used to produce finished integrated circuits.

A storage subsystem of a computer system (such as computer system 1200 of FIG. 12, or host system 1107 of FIG. 11) may be used to store the programs and data structures that are used by some or all of the EDA products described herein, and products used for development of cells for the library and for physical and logical design that use the library.

Figure 11:
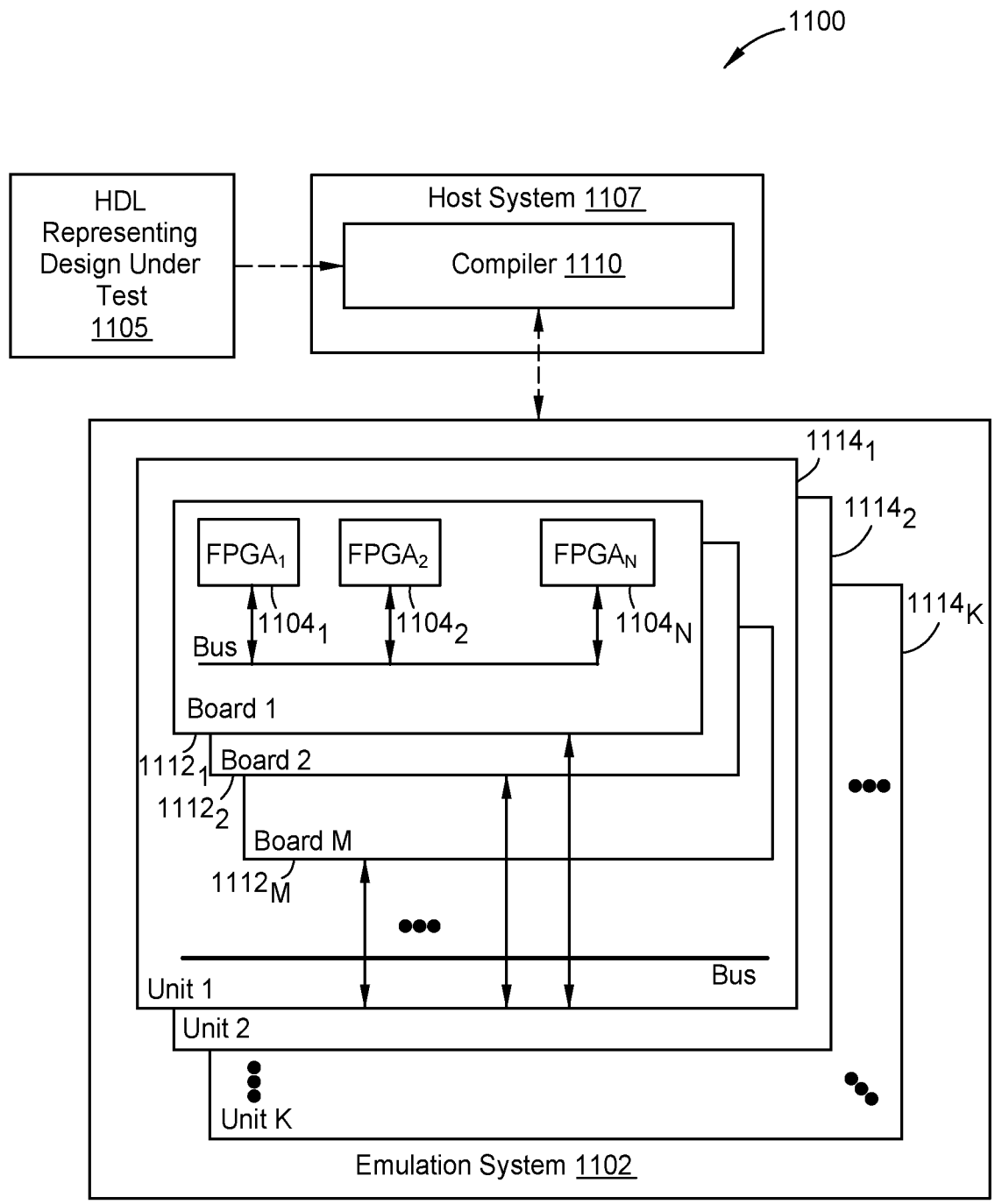
FIG. 11 depicts an abstract diagram of an example emulation system in accordance with some embodiments of the present disclosure.

FIG. 11 depicts an abstract diagram of an example emulation environment 1100. An emulation environment 1100 may be configured to verify the functionality of the circuit design. The emulation environment 1100 may include a host system 1107 (e.g., a computer that is part of an EDA system) and an emulation system 1102 (e.g., a set of programmable devices such as Field Programmable Gate Arrays (FPGAs) or processors). The host system generates data and information by using a compiler 1110 to structure the emulation system to emulate a circuit design. A circuit design to be emulated is also referred to as a Design Under Test ('DUT') where data and information from the emulation are used to verify the functionality of the DUT.

The host system 1107 may include one or more processors. In the embodiment where the host system includes multiple processors, the functions described herein as being performed by the host system can be distributed among the multiple processors. The host system 1107 may include a compiler 1110 to transform specifications written in a description language that represents a DUT and to produce data (e.g., binary data) and information that is used to structure the emulation system 1102 to emulate the DUT. The compiler 1110 can transform, change, restructure, add new functions to, and/or control the timing of the DUT.

The host system 1107 and emulation system 1102 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 1102.11. The host system 1107 and emulation system 1102 can exchange data and information through a third device such as a network server.

The emulation system 1102 includes multiple FPGAs (or other modules) such as FPGAs $1104_1$ and $1104_2$ as well as additional FPGAs to $1104_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1102 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $1104_1$-$804_N$ may be placed onto one or more boards $1112_1$ and $1112_2$ as well as additional boards through $1112_M$. Multiple boards can be placed into an emulation unit $1114_1$. The boards within an emulation unit can be connected using the backplane of the emulation unit or any other types of connections. In addition, multiple emulation units (e.g., $1114_1$ and $1114_2$ through $1114_K$) can be connected to each other by cables or any other means to form a multi-emulation unit system.

For a DUT that is to be emulated, the host system 1107 transmits one or more bit files to the emulation system 1102. The bit files may specify a description of the DUT and may further specify partitions of the DUT created by the host system 1107 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1107 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 1107 and/or the compiler 1110 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 1105 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method of evaluating sampling sizes for circuit simulation, the method comprising:
    generating a plurality of coverage scenarios based on a defect universe;
    determining a coverage amount for each of the plurality of coverage scenarios;
    associating the plurality of coverage scenarios with a plurality of bins based on the coverage amount for each of the plurality of coverage scenarios;
    sampling, with a first sampling size, each of the coverage scenarios to determine first sampled coverage scenarios;
    determining an error value for each of the plurality of coverage scenarios based on the coverage amount of each of the plurality of coverage scenarios and a coverage amount of a respective one of the first sampled coverage scenarios;
    generating, with a processor and for the first sampling size, a confidence score for each of the plurality of bins based on the error value for each of the plurality of coverage scenarios; and
    outputting the confidence score for each of the plurality of bins.

2. The method of claim 1, wherein the defect universe is based on one or more of defect likelihood information, circuit netlist information, and a defect model.

3. The method of claim 1 further comprising:
    determining, for each the plurality of coverage scenarios, a plurality of diagnostic coverage scenarios;
    determining a coverage amount of each of the plurality of diagnostic coverage scenarios;
    associating the plurality of diagnostic coverages scenarios with a second plurality of bins based on the coverage amount for each of the plurality of diagnostic coverage scenarios;
    determining an error for each of the plurality of diagnostic coverage scenarios based on the coverage amount of each of the plurality of diagnostic coverage scenarios and a respective sampled diagnostic coverage amount; and
    generating a confidence score for each of the second plurality of bins based on the error for each of the plurality of diagnostic coverage scenarios.

4. The method of claim 3 further comprising sampling, with a second sampling size, each of the plurality of diagnostic coverage scenarios.

5. The method of claim 1, wherein determining the error value comprises determining a difference between the coverage amount of each of the plurality of coverage scenarios and a respective one of the first sampled coverage scenarios.

6. The method of claim 1, wherein each of the plurality of bins corresponds to a coverage amount for a different one of the plurality of coverage scenarios.

7. The method of claim 1, wherein determining the coverage amount for each of the plurality of coverage scenarios comprises determining, for each of the plurality of coverage scenarios, a ratio of a number of covered defects to a total number of defects.

8. The method of claim 1 further comprising:
    sampling, with a second sampling size, each of the coverage scenarios to determine second sampled coverage scenarios.

9. A non-transitory computer readable medium comprising stored instructions, which when executed by a processor, cause the processor to:
    generate a plurality of coverage scenarios based on a defect universe;
    determine a coverage amount for each of the plurality of coverage scenarios;
    associate the plurality of coverage scenarios with a plurality of bins based on the coverage amount for each of the plurality of coverage scenarios;

sample, with a first sampling size, each of the coverage scenarios to determine first sampled coverage scenarios;

determine an error value for each of the plurality of coverage scenarios based on the coverage amount of each of the plurality of coverage scenarios and a coverage amount of a respective one of the first sampled coverage scenarios;

generate, for the first sampling size, a confidence score for each of the plurality of bins based on the error value for each of the plurality of coverage scenarios; and output the confidence score for each of the plurality of bins.

10. The non-transitory computer readable medium of claim 9, wherein the defect universe is based on one or more of defect likelihood information, circuit netlist information, and a defect model.

11. The non-transitory computer readable medium of claim 10, wherein the instructions, when executed, further cause the processor to:

determine, for each the plurality of coverage scenarios, a plurality of diagnostic coverage scenarios;

determine a coverage amount of each of the plurality of diagnostic coverage scenarios;

associate the plurality of diagnostic coverages scenarios with a second plurality of bins based on the coverage amount for each of the plurality of diagnostic coverage scenarios;

determine an error for each of the plurality of diagnostic coverage scenarios based on the coverage amount of each of the plurality of diagnostic coverage scenarios and a respective sampled diagnostic coverage amount; and generate a confidence score for each of the second plurality of bins based on the error for each of the plurality of diagnostic coverage scenarios.

12. The non-transitory computer readable medium of claim 11, wherein the instructions, when executed, further cause the processor to sample, with a second sampling size, each of the plurality of diagnostic coverage scenarios.

13. The non-transitory computer readable medium of claim 9, wherein determining the error value comprises determining a difference between the coverage amount of each of the plurality of coverage scenarios and a respective one of the first sampled coverage scenarios.

14. The non-transitory computer readable medium of claim 9, wherein each of the plurality of bins corresponds to a coverage amount of a different one of the plurality of coverage scenarios.

15. The non-transitory computer readable medium of claim 9, wherein determining the coverage amount for each of the plurality of coverage scenarios comprises determining, for each of the plurality of coverage scenarios, a ratio of a number of covered defects to a total number of defects.

16. The non-transitory computer readable medium of claim 9, wherein the instructions, when executed, further cause the processor to sample, with second first sampling size, each of the coverage scenarios to determine second sampled coverage scenarios.

17. A system for simulating sampling sizes for circuit simulation, the system comprising:

a memory storing instructions; and one or more processors, coupled with the memory and configured to execute the instructions, the instructions when executed cause the one or more processors to:

generate a plurality of coverage scenarios based on a defect universe;

determine a coverage amount for each of the plurality of coverage scenarios;

associate the plurality of coverage scenarios with a plurality of bins based on the coverage amount for each of the plurality of coverage scenarios;

sample, with a first sampling size, each of the coverage scenarios to determine first sampled coverage scenarios;

determine an error for each of the plurality of coverage scenarios based on the coverage amount of each of the plurality of coverage scenarios and a coverage amount of a respective one of first the sampled coverage scenarios;

generate, for the first sampling size, a confidence score for each of the plurality of bins based on the error for each of the plurality of coverage scenarios; and output the confidence score for each of the plurality of bins.

18. The system of claim 17, wherein the one or more processors are further caused to:

determine, for each the plurality of coverage scenarios, a plurality of diagnostic coverage scenarios;

determine a coverage amount of each of the plurality of diagnostic coverage scenarios;

associate the plurality of diagnostic coverages scenarios with a second plurality of bins based on the coverage amount for each of the plurality of diagnostic coverage scenarios, determine an error for each of the plurality of diagnostic coverage scenarios based on the coverage amount of each of the plurality of diagnostic coverage scenarios and a respective sampled diagnostic coverage amount; and generate a confidence score for each of the second plurality of bins based on the error for each of the plurality of diagnostic coverage scenarios.

19. The system of claim 17, wherein determining the error comprises determining a difference between the coverage amount of each of the plurality of coverage scenarios and a respective one of the first sampled coverage scenarios.

20. The system of claim 17, wherein the one or more processors are further caused to:

sample, with a second sampling size, each of the coverage scenarios to determine second sampled coverage scenarios.

* * * * *

UNITED STATES PATENT AND TRADEMARK OFFICE
CERTIFICATE OF CORRECTION

PATENT NO.         : 11,361,135 B2
APPLICATION NO.    : 17/339186
DATED              : June 14, 2022
INVENTOR(S)        : Mayukh Bhattacharya, Mihir Sherlekar and Antony Fan It is certified that error appears in the above-identified patent and that said Letters Patent is hereby corrected as shown below:

In the Specification

Column 8, Approximately Line 35, Delete "$100 * \frac{\sum_{i=1}^{N_f} \omega_i * C_i}{\sum_{i=1}^{N_f} f_i}.$" and insert -- $100 * \frac{\sum_{i=1}^{N_f} \omega_i * C_i}{\sum_{i=1}^{N_f} \omega_i}.$ --, therefor.

Column 8, Approximately Line 50, Delete "$100 * \frac{\sum_{i=1}^{N_c} \omega_i * C_i}{\sum_{i=1}^{N_c} \omega_i}.$" and insert -- $100 * \frac{\sum_{i=1}^{N_c} \omega_i * C_i}{\sum_{i=1}^{N_c} \omega_i}.$ --, therefor.

Signed and Sealed this
Sixteenth Day of August, 2022

Katherine Kelly Vidal
*Director of the United States Patent and Trademark Office*